Reissued Aug. 14, 1951

Re. 23,398

UNITED STATES PATENT OFFICE 23,398

FLUORENYL AND BENZOHYDRYL ESTERS AND METHOD OF PRODUCING THEM

John W. Cusic, Skokie, and Richard A. Robinson, Morton Grove, Ill., assignors to G. D. Searle & Co., Skokie, Ill., a corporation of Illinois No Drawing. Original No. 2,480,224, dated August 30, 1949, Serial No. 738,501, March 31, 1947. Application for reissue July 19, 1950, Serial No. 174,792

14 Claims. (Cl. 260—482)

Matter enclosed in heavy brackets [ ] appears in the original patent but forms no part of this reissue specification; matter printed in italics indicates the additions made by reissue.

This invention relates to a group of esters of amino-substituted lower alkanoic acids with diaryl carbinols. In particular it relates to compounds having the formula

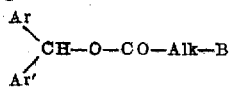

wherein Ar and Ar′ are aryl radicals, Alk is a lower alkylene radical, and B is a secondary or tertiary aliphatic amino radical.

In the above formula, Ar and Ar′ represent simple aryl radicals such as phenyl, tolyl, chlorophenyl, bromophenyl, anisyl, naphthyl, xenyl and the like, and aromaticheterocyclic radicals such as thienyl, pyridyl, furyl and related groups. Ar and Ar′ together can form an arylene group such as the o-biphenylene radical, which together with the CH radical comprises a 9-fluorenyl radical. Other similar diarylmethyl radicals which are within the scope of our invention include 9-xanthyl, 10-thioxanthyl, and 9,10-dihydro-10-anthryl. The secondary- and tertiary-amino substituted lower alkanoic acids which make up the acid portion of the compounds include beta-secondary- and tertiary-aminopropionic acids such as the lower beta-mono- and dialkylaminopropionic acids, beta-piperidinepropionic acid, beta-pyrrolidinopropionic acid, beta-morpholinopropionic acid and alkyl derivatives of these acids; beta- and gamma-secondary- and tertiary-aliphatic-aminobutyric and valeric acids of the same type wherein the amino group is derived from a strong primary or secondary organic base of the aliphatic series or of the aliphatic-type heterocyclic series which has an ionization constant in the range of about $10^{-3}$ to $10^{-5}$. It will be seen that Alk in the above formula represents a lower alkylene radical such as ethylene, propylene, trimethylene, 1,2- and 2,3-butylene and similar radicals. It will be seen further that the basic group B represents an aprimary aliphatic amino radical such as the lower mono- and dialkylamino groups and simple heterocyclic amino groups as represented by those derived from morpholine, piperidine, pyrrolidine, alphamethylpiperidine and other aliphatic-type secondary amines.

Among the compounds which comprise our invention are the following:

(a) Benzohydryl beta-methylethylaminobutyrate, which has the formula

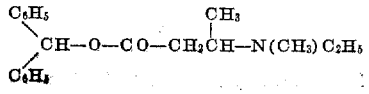

It is prepared by esterifying benzohydrol with beta-chlorobutyric acid and reacting the resulting ester with methylethylamine.

(b) Phenyl-o-tolylcarbinyl gamma-N-pyrrolidinobutyrate, which has the formula

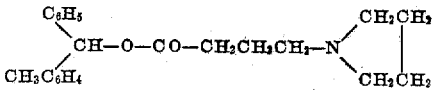

It is synthesized from phenyl-o-tolylcarbinyl gamma-chlorobutyrate by reaction with pyrrolidine at elevated temperature. The phenyl-o-tolylcarbinyl gamma-chlorobutyrate is obtained by reaction of the carbinol with gamma-chlorobutyric acid or with gamma-chlorobutyryl chloride.

(c) p-Anisylphenylcarbinyl beta-methylaminovalerate, which has the formula

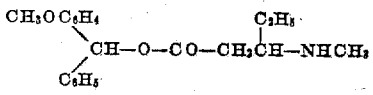

This is prepared from p-anisylphenylcarbinol (obtained by reduction of the methoxybenzophenone) and beta-chlorovaleric acid by esterification and subsequent treatment of the ester with excess methylamine.

(d) 9,10-dihydro-9-anthryl beta-piperidinopropionate, which has the formula

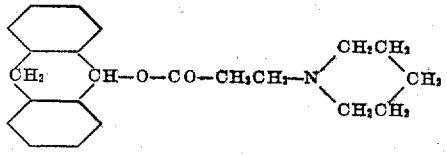

Anthrone is reduced to 9,10-dihydro-9-anthrol and the latter is converted to the ester with beta-bromopropionic acid. The halogenated ester is then condensed with piperidine to form the amino ester.

(e) 9-xanthyl gamma-propylaminobutyrate, which has the formula

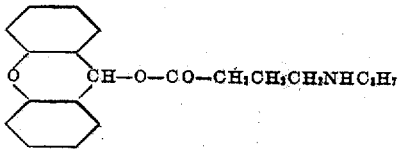

Xanthone is reduced to 9-xanthol, the latter is esterified with gamma-chlorobutyric acid and the resulting halogenated ester is reacted with propylamine.

(f) p-Xenyl-p-chlorophenylcarbinyl beta-(2-methylpiperidino)propionate, which has the formula

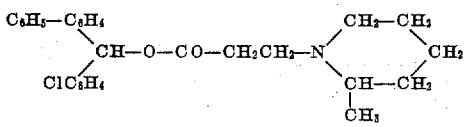

The compounds which comprise our invention are useful in therapeutics, particularly as antispasmodic agents. They exert a powerful relaxing effect on strips of living smooth muscle tissue which have previously been brought into a state of spastic contraction by the action of such agents as histamine, acetylcholine, or barium chloride.

The esters of this invention may be prepared by reacting a halogen-substituted fatty acid with the desired diarylcarbinol and further reacting the halogen ester thus obtained with a primary or secondary amine to form the desired amino acid ester. A preferred process of preparing the diarylmethyl esters of the haloalkanoic acids comprises heating together equivalent quantities of the diarylcarbinol and haloalkanoic acid in the presence of benzene or toluene or other water-immiscible solvents having a boiling point relatively close to that of water, in such a way that a mixture of water and the water-immiscible solvent distils from the reaction mixture. This procedure provides a simple and highly efficient process for the preparation of the desired intermediate esters. The conversion of these halogenated esters into the amino esters which comprise our invention may be carried out by heating the halogenated ester with an excess of a primary or secondary amine in the presence or absence of a solvent, using a closed system when necessary to retain volatile material. The amino esters are only sparingly soluble in water but readily form salts with acids, which salts are generally readily water-soluble. Among the acids which are suitable for forming salts of these bases are hydrochloric, hydrobromic, sulfuric, phosphoric, tartaric, citric, acetic, and similar common acids which provide non-toxic anions. These salts are generally crystalline solids, and since they manifest the same therapeutic properties as the free bases they constitute a preferred form for the use of these compounds. It will be understood that the appended claims include the basic esters whether they be in the form of the free bases or in the form of salts thereof.

Our invention is further disclosed by the following examples, which are merely illustrative in nature and which in no way limit our invention.

EXAMPLE 1

A mixture of 35.8 g. of benzohydrol, 25.4 g. of beta-chloropropionyl chloride, 24.2 g. of dimethylaniline and 400 cc. of benzene is refluxed overnight. The reaction mixture is extracted with dilute hydrochloric acid. The benzene solution is dried with anhydrous calcium chloride and evaporated. 27 g. of the crude benzohydryl beta-chloropropionate thus obtained is heated in a sealed tube with 15 g. of diethylamine at 100° C. for 8 hours. The tube is opened and its contents are washed out with dilute hydrochloric acid. This solution is extracted with ether to remove non-basic material. It is then made alkaline and extracted with ether. The ether extract is washed, dried with anhydrous sodium sulfate, and evaporated. The residue is distilled;

B. P. 190–195° C. at 4 mm. The free base, when dissolved in dry ether and treated with saturated alcoholic hydrogen chloride, forms benzohydryl beta-diethylaminopropionate hydrochloride which melts at 174° C. after recrystallization from isopropanol. Treatment of the base with ethyl bromide in methyl ethyl ketone at 100° C. results in the formation of the ethobromide of M. P. 152° C.

By reacting benzohydryl beta-chloropropionate with dimethylamine by a process similar to the above, there is obtained benzohydryl-beta-dimethylaminopropionate hydrochloride of M. P. 154–155° C. Treatment of benzohydryl beta-dimethylaminopropionate with methyl chloride in methyl ethyl ketone results in the formation of the methochloride, M. P. 140–145° C.

EXAMPLE 2

A solution of 35.6 g. of 9-fluorenol, 25.4 g. of beta-chloropropionyl chloride, 24.2 g. of dimethylaniline and 500 cc. of dry benzene is heated to reflux for 12 hours. The reaction mixture is extracted with dilute hydrochloric acid, washed with water, and dried over anhydrous calcium chloride. The solvent is removed by evaporation and heating in vacuo on a steam bath. 27.2 g. of 9-fluorenyl beta-chloropropionate is heated in a sealed tube with two molar equivalents (14.6 g.) of diethylamine at 105° C. for 14 hours. The contents of the tube are dissolved in dilute hydrochloric acid and filtered. The filtrate is made alkaline and extracted with ether. The ether extract is dried and evaporated and the residue distilled. 9-fluorenyl beta-diethylaminopropionate distils at 200–203° C. at 3 mm. Its hydrochloride may be prepared from a dry ethereal solution of the base by addition of alcoholic hydrogen chloride, and melts at 171–172° C. after recrystallization from isopropanol.

By heating in a closed system at 100° C. for 8 hours 22 g. of 9-fluorenyl beta-chloropropionate, 10 g. of dimethylamine and 75 cc. of toluene, there is produced 9-fluorenyl beta-dimethylaminopropionate, which is isolated as in the above example. It distils at 195–200° C. at 1–2 mm. and forms a hydrochloride melting at 183–185° C.

EXAMPLE 3

A solution of 23.4 g. of phenyl-alpha-naphthylcarbinol and 7.9 g. of pyridine in benzene is cooled and treated with 12.7 g. of beta-chloropropionyl chloride in benzene. There is an immediate precipitate which upon standing becomes solid. The addition of ether and water causes the solution of this precipitate and the formation of two layers. The organic layer is separted, washed with water, and dried with anhydrous calcium chloride. The solvent is removed and the crude ester remaining is refluxed overnight with a solution of 17 g. of piperidine in 150 cc. of toluene. The precipitate is removed by filtration. The filtrate is evaporated to remove toluene and piperidine. The cooled residue is taken up in ether and treated with alcoholic hydrogen chloride. The precipitated hydrochloride is removed by filtration, washed with ether, dried in vacuo, and recrystallized from isopropanol. Phenyl-alpha-naphthylcarbinyl beta-N-piperidinopropionate hydrochloride melts at 200–201° C.

EXAMPLE 4

A solution of 27.4 g. of benzohydryl beta-chloropropionate (Example 1) and 17.4 g. of morpholine in 100 cc. of toluene is refluxed for 5 hours. The morpholine hydrochloride is removed by filtration and the filtrate is evaporated and distilled under reduced pressure, resulting in benzohydryl beta-N-morpholinopropionate of B. P. 200–220° C. at 2–3 mm. The hydrochloride is prepared by treatment of a dry ether solution of the base with alcoholic hydrogen chloride, and melts at 180–181° C. after recrystallization from isopropanol.

By using an equivalent amount of piperidine in the above example, there is obtained benzohydryl beta-N-piperidinopropionate, B. P. 180–210° C. at 3 mm., which forms a hydrochloride melting at 193–194° C. after recrystallization from isopropanol.

EXAMPLE 5

A solution of 54.2 g. of beta-chloropropionic acid and 92 g. of benzohydrol in 400 cc. of toluene is refluxed. The condensate is returned to the reaction vessel via a water separator. In 3 hours 7 cc. of water is collected and overnight an additional 1 cc. of water is obtained (89% of theory). The toluene is then removed by distillation and benzohydryl beta-chloropropionate, B. P. 195–210° C. at 10–12 mm., is obtained in excellent yield. Condensation of this chloro ester with pyrrolidine as in Example 1 results in the formation of benzohydryl beta-N-pyrrolidinopropionate. Similarly, condensation of benzohydryl beta-chloropropionate with excess butylamine gives rise to benzohydryl beta-butylaminopropionate.

We claim:

1. A 9-fluorenyl ester of a beta-lower-dialkylaminopropionic acid, which has the formula

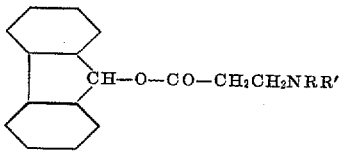

wherein R and R' are lower alkyl radicals.

2. 9-fluorenyl beta-dimethylaminopropionate.

3. The process of producing a 9-fluorenyl ester of a lower tertiary-aliphatic-aminoalkanoic acid which comprises esterifying a lower haloalkanoic acid with a 9-fluorenol and reacting the ester thus formed with a secondary aliphatic amine.

4. In a process of producing a 9-fluorenyl ester of a lower tertiary-aliphatic-aminoalkanoic acid, the step which comprises esterifying a lower haloalkanoic acid with a 9-fluorenol with the simultaneous removal of water by continuous distillation with a water-immiscible, moderately high-boiling solvent.

5. A 9-fluorenyl beta-dialkylaminoalkanoate, which has the formula

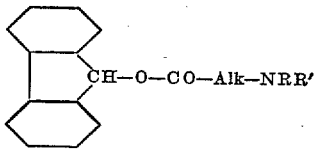

wherein Alk is a lower alkylene radical and R and R' are lower alkyl radicals.

6. A 9-fluorenyl beta-di(lower alkyl) aminopropionate.

7. 9-fluorenyl beta-diethylaminopropionate.

8. The process of producing a 9-fluorenyl beta-dialkylaminopropionate which comprises esterifying beta-chloropropionic acid with 9-fluorenol with the simultaneous removal of water by continuous distillation with a water-immiscible, moderately high-boiling solvent, reacting the chloro-ester thus formed with a dialkylamine, and recovering the 9-fluorenyl beta-dialkylaminopropionate.

*9. A basic ester, which has the formula*

$$RR'N—Alk—COOCHA_2$$

*wherein R and R' are lower alkyl radicals which may be joined together to form saturated N-heteromonocyclic radicals having 5–6 ring atoms. Alk is a lower alkylene radical and $CHA_2$ is a member of the group consisting of benzohydryl and 9-fluorenyl.*

*10. An ester of a beta-dialkylaminoalkanoate, which has the formula*

$$X—O—CO—Alk—NRR'$$

*wherein X is a member of the group consisting of benzohydryl and 9-fluorenyl radicals, Alk is a lower alkylene radical and R and R' are lower alkyl radicals.*

*11. A benzohydryl beta-dialkylaminoalkanoate, which has the formula*

$$(C_6H_5)_2CH—O—CO—Alk—NRR'$$

*wherein Alk is a lower alkylene radical and R and R' are lower alkyl radicals.*

*12. The process of producing an ester of a lower tertiary-aliphatic-aminoalkanoic acid which comprises esterifying a lower haloalkanoic acid with a member of the group consisting of benzohydrol and 9-fluorenol and reacting the ester thus formed with a secondary aliphatic amine.*

*13. The process of preparing a basic ester, which has the formula*

$$RR'N—Alk—COOCHA_2$$

*wherein R and R' are lower alkyl radicals which may be joined together to form saturated N-heteromonocyclic radicals having 5–6 ring atoms, Alk is a lower alkylene radical and $CHA_2$ is a member of the group consisting of benzohydryl and 9-flurorenyl, which comprises treating a compound having the formula*

$$halogen—Alk—COOCHA_2$$

*with a secondary amine having the formula RR'NH, where Alk, $CHA_2$, R and R' have the meanings designated hereinabove.*

*14. The process of preparing a basic ester, which has the formula*

$$(C_6H_5)_2CH—O—CO—Alk—NRR'$$

*wherein Alk is a lower alkylene radical and R and R' are lower alkyl radicals, which comprises treating a compound having the formula*

$$(C_6H_5)_2CH—O—CO—Alk—halogen$$

*with a secondary amine having the formula RR'NH, where Alk, R and R' have the meanings designated hereinabove.*

JOHN W. CUSIC.
RICHARD A. ROBINSON.

REFERENCES CITED

The following references are of record in the file of this patent or the original patent:

Fries et al., Ber. Deut. Chem., vol. 54, page 717 (1921).

Righetti, Bull. Societe Chimique de France, vol. 5, Series 5, pages 1466–1468 (1938).

Petrenko-Kritschenko et al., Zietschrift fur Phys. Chemie, vol. 115, page 298.